(12) United States Patent
Otani et al.

(10) Patent No.: US 7,016,528 B2
(45) Date of Patent: Mar. 21, 2006

(54) MEASURING APPARATUS

(75) Inventors: Hitoshi Otani, Tokyo (JP); Nobuo Kochi, Tokyo (JP)

(73) Assignee: Kabushiki Kaisha TOPCON, Tokyo (JP)

( * ) Notice: Subject to any disclaimer, the term of this patent is extended or adjusted under 35 U.S.C. 154(b) by 716 days.

(21) Appl. No.: 10/194,285

(22) Filed: Jul. 15, 2002

(65) Prior Publication Data

US 2002/0181764 A1 Dec. 5, 2002

Related U.S. Application Data

(62) Division of application No. 09/081,620, filed on May 20, 1998, now Pat. No. 6,442,292.

(30) Foreign Application Priority Data

May 22, 1997 (JP) .................................. 9-147059
May 22, 1997 (JP) .................................. 9-147066

(51) Int. Cl.
*G06K 9/00* (2006.01)
(52) U.S. Cl. ........................ 382/154; 382/209; 382/291
(58) Field of Classification Search ................ 382/154
See application file for complete search history.

(56) References Cited

U.S. PATENT DOCUMENTS 4,175,862 A 11/1979 DiMatteo (Continued)

FOREIGN PATENT DOCUMENTS

JP 61-209314 9/1986

(Continued)

OTHER PUBLICATIONS

Barnea et al., "A Class of Algorithms for Fast Digital Image Registration", IEEE Transactions on Computers, vol. C-21, No. 2, pp. 179-186 (1972).

(Continued)

*Primary Examiner*—Jing Ge Wu
*Assistant Examiner*—Jordan Kuhn
(74) *Attorney, Agent, or Firm*—Foley & Lardner LLP (57) ABSTRACT

An image measuring apparatus includes an approximate position measuring portion for approximately obtaining, from a pair of images of a subject for measurement in different directions, positional information of the subject for measurement in each of the images. A data setting portion, having one image of the pair of images set as a reference image and the other image as a searched image, sets up, in accordance with the positional information obtained in the approximate position measuring portion, reference data blocks in the reference image and sets up searched areas in the searched image and searched data blocks in the searched area. A correspondence determining portion obtains correspondence between the searched data block set up in the searched area and the reference data block. The data setting portion, in accordance with the positional information obtained in the approximate position measuring portion, performs at least either setting up of the reference data blocks in the reference image or setting up of the searched areas and setting up of the searched data blocks in the searched image.

16 Claims, 6 Drawing Sheets

U.S. PATENT DOCUMENTS

| | | | |
|---|---|---|---|
| 4,731,853 A | | 3/1988 | Hata et al. |
| 4,858,157 A | | 8/1989 | Murai et al. |
| 4,962,422 A | | 10/1990 | Ohtomo et al. |
| 4,965,442 A | | 10/1990 | Girod et al. |
| 5,519,485 A | | 5/1996 | Ohtani et al. |
| 5,818,959 A | | 10/1998 | Webb et al. |
| 5,852,672 A | | 12/1998 | Lu |
| 5,867,591 A | * | 2/1999 | Onda .................. 382/154 |
| 5,917,937 A | | 6/1999 | Szeliski et al. |
| 5,953,448 A | | 9/1999 | Liang |
| 5,969,722 A | | 10/1999 | Palm |
| 6,141,439 A | * | 10/2000 | Yoshida et al. .......... 382/154 |
| 6,229,913 B1 | | 5/2001 | Nayar et al. |

FOREIGN PATENT DOCUMENTS

| | | |
|---|---|---|
| JP | 61-209315 | 9/1986 |
| JP | 63-024116 | 2/1988 |

OTHER PUBLICATIONS

Oliver Faugeras, "Three-dimensional Computer Vision—A Geometric Viewpoint", MIT PRESS, Cambridge, Massachusetts, XP002206708, 1993, pp. 165-169 and 189-193.

M. Accame et al., "Hierarchical Block Matching for Disparity Estimation in Stereo Sequences", Proceedings of the International Conference on Image Processing (ICIP), Oct. 23-26, 1995, IEEE Comp. Soc. Press, US, vol. 3, Oct. 23, 1995, pp. 374-377.

* cited by examiner

MEASURING APPARATUS

This application is a divisional of U.S. patent application Ser. No. 09/08 1,620, filed May 20,1998, now U.S. Pat. No. 6,442,292 and is incorporated herein by reference.

BACKGROUND OF THE INVENTION

1. Technical Field

The invention relates to technologies for achieving automation of orientation work at the preceding stage of making three-dimensional measurement from different camera positions, automatic acquisition of initial values for stereo matching, and automation of the three-dimensional measurement.

2. Prior Art

Figure 1:
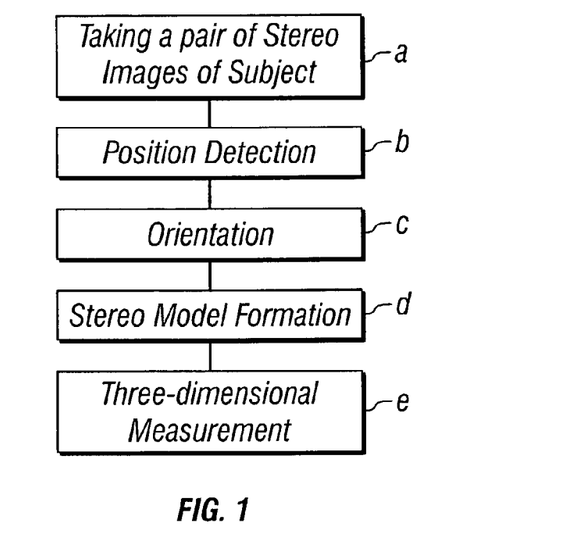
FIG. 1 is a block diagram showing a flow of measuring processes in a shape measuring apparatus of the invention.

In performing three-dimensional measurement in close-range photogrammetry the measurement is carried out through the flow of processes as shown in FIG. 1. Namely, it is required to perform processes of taking a pair of stereo images of a subject (a)→position detection (b)→orientation (c)→stereo model formation (d)→three-dimensional measurement (e). Although these processes are performed mainly by operations of a computer, the processes of the position detection (b) and the three-dimensional measurement (e) have so far been performed manually. The position detection (b) is a preprocess of the orientation, which is a process to obtain position, inclination, and the like of the cameras for taking images.

By obtaining the relative position between the cameras and the subject in the process of the orientation (c), it becomes possible to form a stereo model providing a stereo view and achieve the three-dimensional measurement. The process of the position detection (b) preceding the orientation (c) is such work as to obtain coordinate positions, on each camera, of six or more corresponding points taken by separate cameras.

In the three-dimensional measurement (e), there are two kinds: point measurement and planar measurement.

In the case of the point measurement, the point to be measured on the subject is generally measured manually. However, when automatic measurement is planned or improvement in accuracy is desired, it is practiced to glue a mark onto the subject.

In the case of the planar measurement, automatic measurement is carried out by using a method of stereo matching through image processing. Then, however, it was required to make such initial setting as determination of a template image and setting up of the searched width through manual work.

In the work of the position detection (b), the operator selects six or more points of measurement on the subject in the left and right images and, while observing each image, correlates the points of measurement on the subject with each other and detects the coordinates of the positions. However, since the operator basically had to do such work while taking a stereo view, it required skill and, in addition, it was complicated, difficult, and problematic.

Especially, in such work as to correlate the left and right images with each other upon determination of the points of measurement and detect the detailed coordinates of the positions, personal errors were liable to occur, results were different from operator to operator, and sufficient accuracy was difficult to obtain. There were even cases where such measurement was unachievable by some operators. To obviate the difficulties, such a method as to glue a mark onto the subject is sometimes practiced.

However, it is an unfavorable thing for such work as gluing a mark onto the subject to increase, and there are even such cases where, depending on the subjects, gluing a mark onto the subject is very difficult. Therefore, this method has not come into wide use.

There is also such a method to perform three-dimensional measurement with two cameras firmly fixed onto a stereo pan tilt head thereby eliminating the orientation work.

In this case, however, there should absolutely be no deviation in the relative position between two cameras on the pan tilt head, and therefore the measurement environment and the subject for measurement are greatly limited. At the same time, such apparatus becomes large, heavy, and difficult to handle and, besides, expensive. Hence, this method also is not used so widely.

Further, in the point measurement in the three-dimensional measurement (e), when a mark or the like is not glued onto the subject for measurement, the operator had to indicate the point of measurement while observing the taken image in the course of the measurement. Therefore, much labor and time were required when there were many points of measurement. Further, when it was attempted to make precise measurement, personal errors were liable to occur and, in the worst case, measurement itself became unachievable.

Such things as described above can be obviated if measurement is carried out after gluing a mark onto a subject, but in that case, as described above, the labor for attaching the mark was newly required and, depending on the subjects, it was difficult to glue a mark onto the subject and sometimes it became impossible to make measurement.

In the case of the planar measurement, it was required to manually make such work as to determine the template image and determine an optimum searched width as a preprocess in making automatic measurement through stereo matching. Further, when mismatched points or the like occurred, correction had to be made manually. Thus, it was difficult to realize automation.

SUMMARY OF THE INVENTION

It is an object of the invention to provide a shape measuring apparatus, an image measuring apparatus, and an image forming apparatus capable of performing the processes from the orientation work to the three-dimensional measurement automatically, effectively, and precisely.

A preferred shape measuring apparatus according to the invention comprises a characteristic pattern extracting portion, in accordance with a pair of first images of a subject for measurement having characteristic patterns serving as references provided thereon in different angles and a pair of second images of the subject for measurement having no characteristic patterns serving as references provided thereon in the same angles as with the first images, for calculating the difference between the first image and the second image taken in each direction thereby obtaining the characteristic patterns, positional relationship calculating portion for obtaining a positional relationship between the pair of the first images or the pair of the second images on the basis of the difference images obtained in the characteristic pattern extracting portion, a stereo model forming portion, in accordance with the positional relationship obtained in the positional relationship calculating portion, for mutually relating the fist images or the second images so that a stereo model capable of being stereoscopically viewed is formed, and a shape measuring portion for obtaining the shape of the subject in accordance with the stereo model formed in the stereo model forming portion.

The characteristic pattern extracting portion can be adapted to extract the characteristic pattern image through comparison of the difference image constituted of the difference between the first image and the second image taken in each direction with a reference characteristic pattern image previously stored.

The characteristic pattern extracting portion can be adapted to extract the characteristic pattern image through comparison, according to a template matching method, of the difference image constituted of the difference between the first image and the second image taken in each direction with a reference characteristic pattern image previously stored.

The characteristic pattern extracting portion can be adapted to extract the characteristic pattern image first by making coarse detection according to a template matching method and then making precise detection by applying predetermined processing to an image in the vicinity of a characteristic pattern.

A preferred image forming apparatus for shape measurement according to the invention comprises a characteristic pattern forming portion for selectively forming characteristic patterns serving as references on a subject for measurement and an image forming portion for taking an image of a subject for measurement having characteristic patterns serving as references provided thereon in different directions thereby obtaining a pair of first images and taking an image of the subject for measurement having no characteristic patterns serving as references provided thereon in the same directions as with the first images thereby obtaining a pair of second images.

The characteristic pattern forming portion can be constituted of a characteristic pattern projecting portion for selectively projecting characteristic patterns serving as references onto a subject for measurement.

A preferred image measuring apparatus according to the invention comprises an approximate position measuring portion for approximately obtaining, from a pair of images of a subject for measurement in different directions, positional information of the subject for measurement in each of the images, a data setting portion, having one image of the pair of images set as a reference image and the other image as a searched image, for setting up, in accordance with the positional information obtained in the approximate position measuring portion, reference data blocks in the reference image and setting up searched areas in the searched image and searched data blocks in the searched area, and a correspondence determining portion for obtaining correspondence between the searched data block set up in the searched area and the reference data block. The data setting portion, in accordance with the positional information obtained in the approximate position measuring portion, performs at least either setting up of the reference data blocks in the reference image or setting up of the searched areas and setting up of the searched data blocks in the searched image.

The pair of images include a characteristic pattern image of which positional information is previously known and the approximate position measuring portion can be adapted, in accordance with the position of the characteristic pattern image in the reference image and the positional information of the characteristic pattern image in the searched image, to approximately obtain the positional information of the subject for measurement in each of the pair of images.

The data setting portion can be adapted to set up the range of the searched area in the searched image in accordance with the position of the characteristic pattern image in the searched image.

The data setting portion can be adapted to set up the range of the searched area in the searched image in accordance with its relationship with the position of the characteristic pattern image and the position of the searched area in the searched image or with the position of the characteristic pattern image and the position of the reference data block in the reference image.

The data setting portion can be adapted to set up the magnitude of the range of the searched area in the searched image in accordance with its relationship with the position of the characteristic pattern image and the position of the searched area in the searched image or with the position of the characteristic pattern image and the position of the reference data block in the reference image.

The data setting portion can be adapted to set up in the searched image the range of the searched area having a larger width or area according as the characteristic pattern image and the searched area in the searched image, or the characteristic pattern image and the reference data block in the reference image, are more distant from each other.

The data setting portion can be adapted to set up a plurality of searched areas differing in size.

The data setting portion can be adapted to set up the reference data block in the reference image in accordance with the position of the characteristic pattern image in the reference image.

The data setting portion can be adapted to set up the magnitude of the reference data block in the reference image in accordance with the position of the characteristic pattern image and the position of the reference data block in the reference image.

The data setting portion can be adapted to set up in the reference image the reference data block larger in height or width according as the position of the characteristic pattern image and the position of the reference data block in the reference image are more distant from each other.

The data setting portion can be adapted to set up a plurality of reference data blocks differing in size in accordance with the characteristic pattern image in the reference image.

DESCRIPTION OF THE PREFERRED EMBODIMENTS

An embodiment of the invention will be described with reference to the accompanying drawings.

Figure 2:
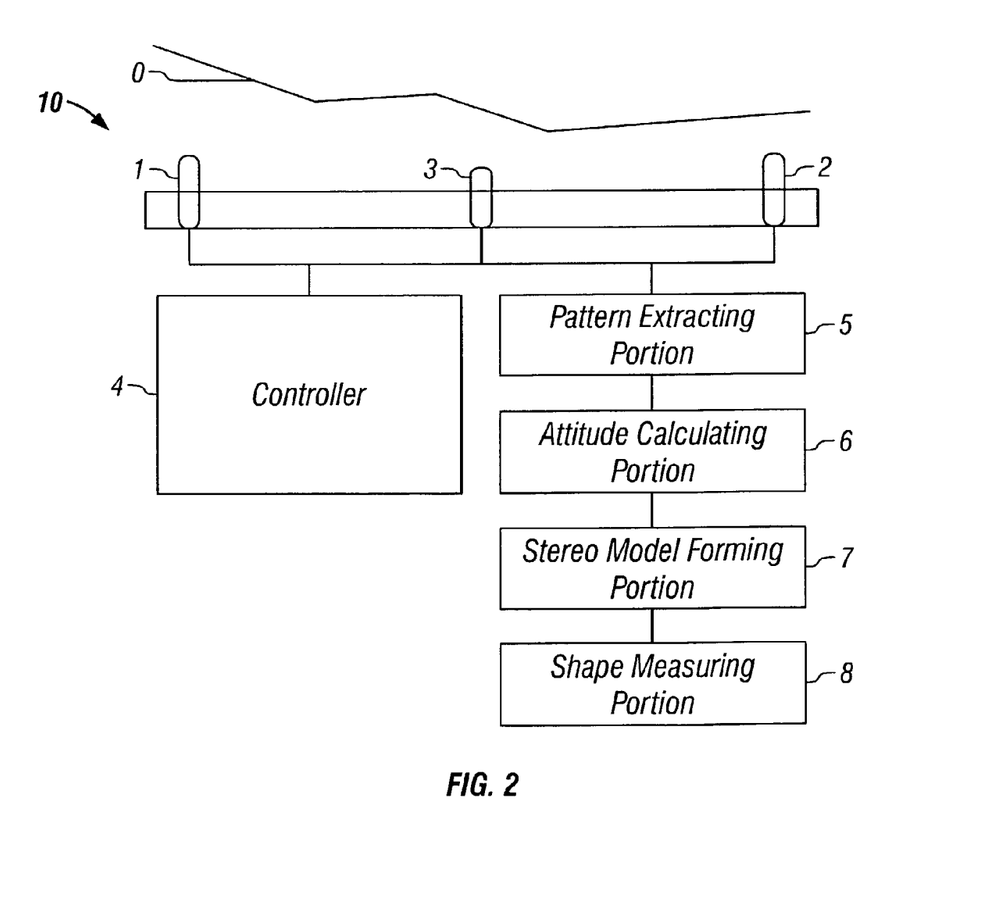
FIG. 2 is a block diagram conceptually showing the shape measuring apparatus of the invention.

FIG. 1 shows a flow of measurement processes in the invention and FIG. 2 is a block diagram conceptually showing a shape measuring apparatus of the invention.

a. TAKING STEREO IMAGES OF SUBJECT

First, in accordance with the instructions from a controller 4, characteristic patterns are projected from a characteristic pattern projecting portion 3 onto a subject for measurement 0. Then, the image of the subject for measurement 0 is taken by a left and a right picture taking portion 1 and 2 and the image data is transferred to a characteristic pattern extracting portion 5.

Figure 3:
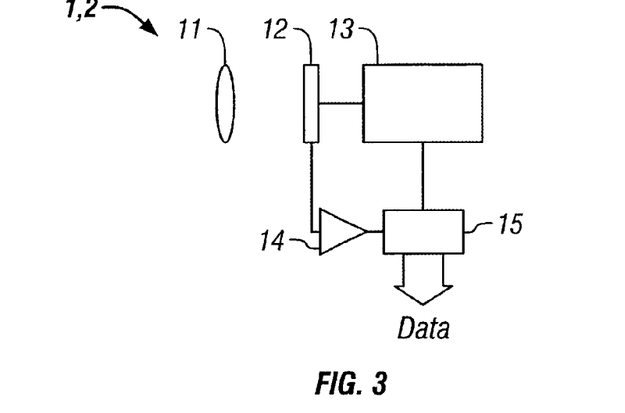
FIG. 3 is a left and a right picture taking portion of the shape measuring apparatus.

The left and right image taking portions 1 and 2 comprise, as shown in FIG. 3, an optical system 11, a CCD 12, a CCD driver 13, an operational amplifier 14, an A/D converter 15, and the like.

Figure 5:
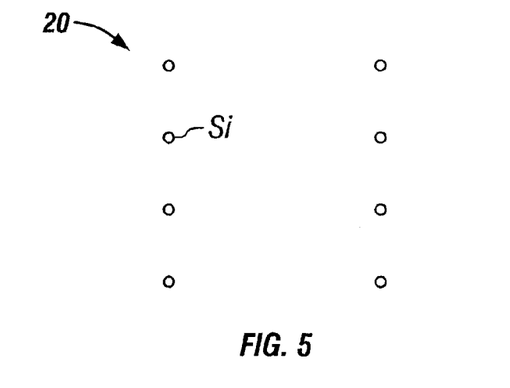
FIG. 5 is a plan view showing an example of projected patterns.
Figure 6:
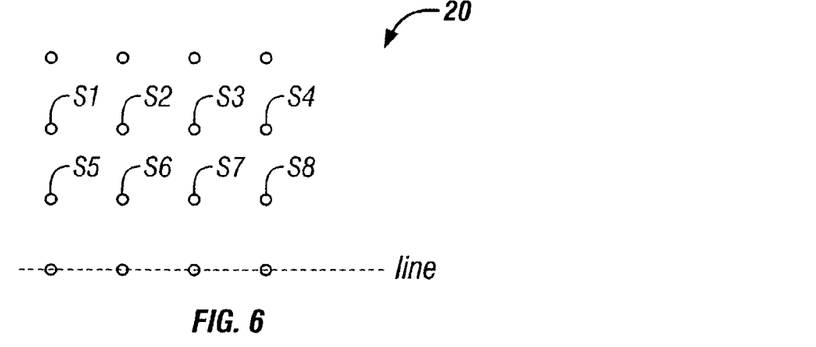
FIG. 6 is a plan view showing another example of projected patterns.

FIG. 5 and FIG. 6 show examples of characteristic patterns. Although these characteristic patterns 20 here are of a circular form, they may be of any form other than such a circular form provided that they can provide the mark image positions provided by the characteristic pattern projection.

As the characteristic pattern projecting portion 3, any apparatus, such as a slide projector and a laser pointer, that is capable of projecting characteristic patterns 20 can be used.

Figure 4:
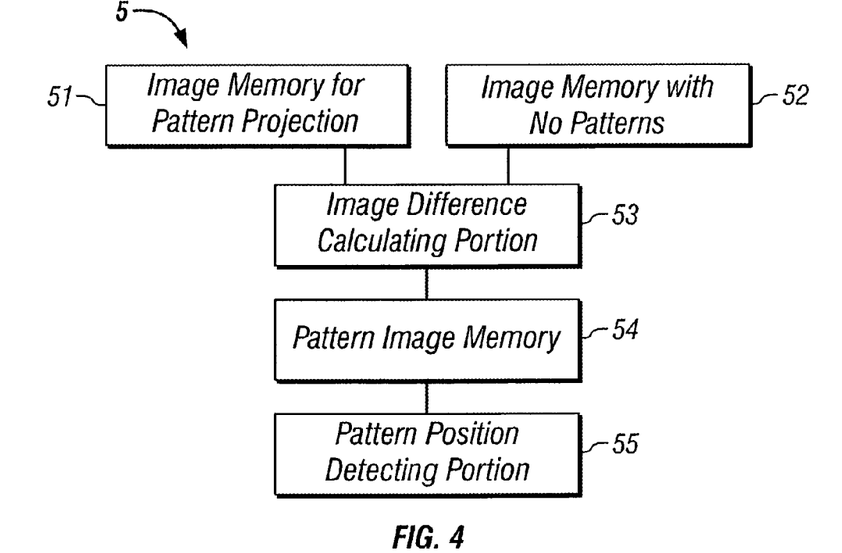
FIG. 4 is a block diagram showing a pattern extracting portion of the shape measuring apparatus.

FIG. 4 is a block diagram showing details of the characteristic pattern extracting portion 5.

The image data transferred from the left and right image taking portions 1 and 2 are converted into digital data by the A/D converter 15 in FIG. 3 and transferred to an image memory for characteristic pattern projection 51 of the characteristic pattern extracting portion 5.

Then, in accordance with instructions from the controller 4, the characteristic pattern projection is stopped and images having no characteristic patterns are taken by the left and right image taking portions 1 and 2 and the pertinent digital data are sent to an image memory for images having no characteristic patterns 52 of the characteristic pattern extracting portion 5.

When the image transfer to the image memory for characteristic pattern projection 51 and the image memory for images having no projected characteristic patterns 52 has been finished, the two images, in accordance with instructions from the controller 4, are subjected to difference calculation in an image difference calculator 53. The difference image is stored into a characteristic pattern image memory 54.

As a result, the data stored in the characteristic pattern image memory 54 becomes such that has the image information of the subject for measurement 0 erased, i.e., that contains only the information of the characteristic patterns 20 (mark image data).

b. POSITION DETECTION

In order to perform the orientation process, detection of the mark image positions provided by the characteristic pattern projection is carried out.

The characteristic pattern coordinate positions in the characteristic pattern image memory 54 are detected by a characteristic pattern position detecting portion 55.

Although the characteristic patterns 20 may be of any form provided that it clearly indicates its position, those used here are assumed to be such characteristic patterns 20 as shown in FIG. 5 or FIG. 6. Further, the characteristic patterns can be of any number if it is 6 or above as shown in FIG. 5 or FIG. 6.

Since there is included, in the characteristic pattern image memory 54, no other information than the mark image obtained by the projection of the characteristic patterns, erroneous detection can be prevented from occurring. Further, since it is facilitated to have the position detection performed automatically, it is made possible to carry out constantly stabilized detection of the coordinates of positions free from personal errors and with precision.

Here, a case where a template matching method is used for coarse position detection of the points and a moment method is used for detailed position detection will be described.

With respect to the template matching method, the sequential similarity detection algorithm (SSDA method) as a kind of correlation method will be described, but a normalized correlation method or the like may also be used. In the detailed position detection, such a method as LOG (Laplacian of Gausian) filter method may also be used instead of the moment method.

Below will be given description on position detecting processes.

(Coarse Position Detection)

1. A template image is registered.

As the template image, a simulation image similar to one of the marks of the projected characteristic patterns 20 shown in FIG. 5 or FIG. 6 may be produced or any of the actual images may be selected for use.

2. points satisfying S>R (a, b) are searched for in the entire image (refer to Equation 1).

The closer to 0 the value R(a, b), the higher is the similarity. As S, a suitable value is previously set. Since, in this case, other image information than the characteristic patterns is erased, determination is easily made. While the normalized correlation method may be used for the template matching, the process can be performed faster if the sequential similarity detection algorithm is used.

[Sequential Similarity Detection Algorithm (SSDA Method)]

Figure 7:
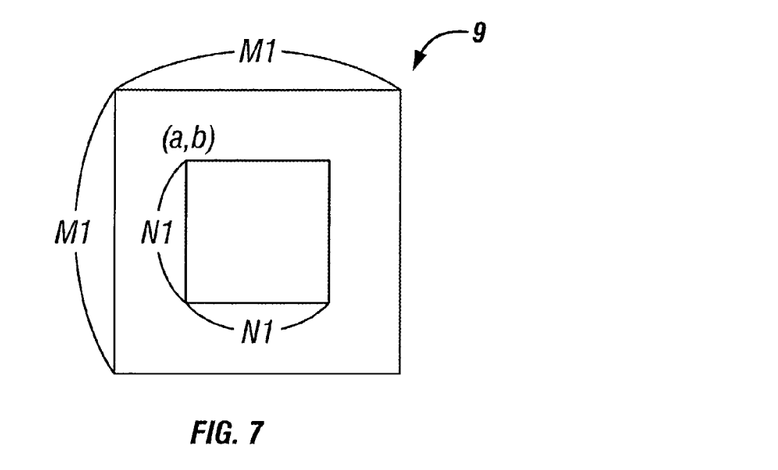
FIG. 7 is an explanatory drawing showing template matching according to an SSDA method.

The principle drawing of the SSDA method is shown in FIG. 7 and the pertinent equation is shown in Eq. 1.

The point at which the residual R (a, b) comes to a minimum is the position of the wanted mark.

Eq. 1

$$R(a, b) = \sum_{ml=0}^{NI-1} \sum_{nl=0}^{NI-1} |I_{(a,b)}(m_1, n_1) - T(m_1, n_1)| \qquad \text{Eq. 1}$$

$T(m_1, n_1)$ Template Image
$I_{(a,b)}(m_1, n_1)$ : Partial Image of Subject's Image
(a, b) : Upper Left Coordinates of Template Image
R(a, b) Residual In making the addition of Eq. 1, if the calculating operation is adapted such that the addition is stopped when the value of R(a, b) exceeds the minimum value of the residuals obtained in the past and it is shifted to the next (a, b), faster processing can be achieved.

3. The mark positions of the projected characteristic patterns of the desired number of marks are determined according to such conditions as the value R(a, b) being at a minimum and distances between adjoining mark positions, and the same are used as position coordinates.

(Detailed Position Determination)

1. Determination of Searched Area

A searched area is set up centering around the point determined in the above described coarse position detection.

2. Determination of Mark Region

Figure 8A:
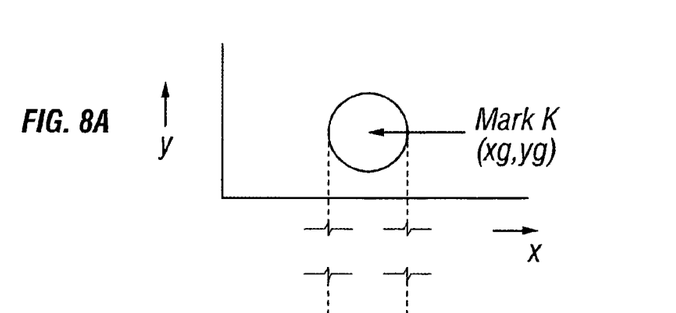
FIG. 8 an explanatory drawing showing a moment method.
Figure 8B:
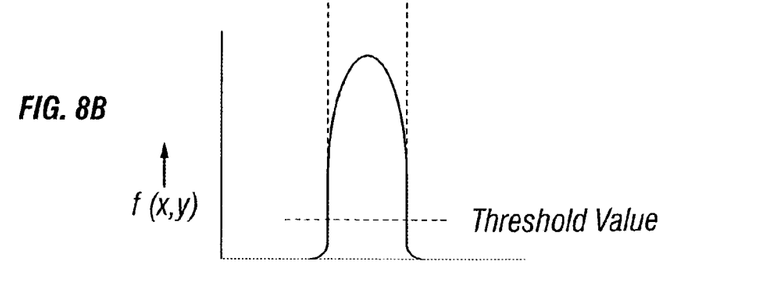

With respect to the searched area, a region where the density is over a threshold value is set as a mark (refer to FIG. 8).

As the threshold value, a suitable value is preset. The image is virtually 0 at other portions than the marks because it has been subjected to the difference processing.

3. Calculation of Center of Gravity

The position coordinate of the center of gravity is calculated according to a moment method.

[Moment Method]

The following equations are applied to the points over the threshold value T (the mark K) as shown in FIG. 8.

Eq. 2

$xg = \{\Sigma x \cdot f(x,y)\}/\Sigma f(x,y)$ (xg, yg): Coordinates of Center of Gravity
f(x, y): Concentration at Coordinates (x, y)

Eq. 3

$yg = \{\Sigma y \cdot f(x,y)\}/\Sigma f(x,y)$ (xg, yg): Coordinates of Center of Gravity
f(x, y): Concentration at Coordinates (x, y)

By Eq. 2 and Eq. 3, it becomes possible to calculate the position of the center of gravity down to the sub-pixel position.

4. Operations 1–3 are performed on each of the total number of the points.

By performing the above processes, the coordinates of the mark image positions provided by the characteristic pattern projection as shown in FIG. 5 or FIG. 6 can be calculated.

It may be possible to make the detailed position detection from the beginning without making the coarse position detection. Further, any other algorithm than the above may be used for the position detection.

In any way, since the image is only of the information of the characteristic patterns, it is possible to calculate positions fast and precisely.

c. ORIENTATION

Then, the coordinate values obtained in the characteristic pattern position detecting portion 55 are sent to an attitude calculating portion 6, wherein calculation for the orientation work is performed.

By this calculation, the positions of both the cameras at the left and right and the like can be obtained.

Those parameters are obtained in accordance with the following coplanar conditional expression:

Eq. 4

$$\begin{vmatrix} X_{01} & Y_{01} & Z_{01} & 1 \\ X_{02} & Y_{02} & Z_{02} & 1 \\ X_1 & Y_1 & Z_1 & 1 \\ X_2 & Y_2 & Z_2 & 1 \end{vmatrix} = 0 \qquad \text{Eq. 4}$$

$X_{01}, Y_{01}, Z_{01}$: Coordinates of Center of Projection on Left Image
$X_{02}, Y_{02}, Z_{02}$: Coordinates of Center of Projection on Right Image
$X_1, Y_1, Z_1$: Image's Coordinates in Left Image
$X_2, Y_2, Z_2$: Image's Coordinates in Right Image The origin of the model coordinate system is taken at the center of projection on the left and X-axis is taken along the line connecting it to the center of projection on the right. The reduced scale is set by taking the length of the base line as the unit length. At this time, the parameters being sought are constituted of the angle of rotation $_\kappa 1$ around Z-axis and the angle of rotation $_\phi 1$ around the Y-axis of the camera on the left and the angle of rotation $_\kappa 2$ around Z-axis, the angle of rotation $_\phi 2$ around the Y-axis, and the angle of rotation 2 around X-axis of the camera on the right, five angles of rotation in all. In this case, since the angle of rotation $_\omega 1$ around X-axis of the camera on the left is 0, there is no need to consider it.

Under such conditions, the coplanar conditional expression of Eq. 4 becomes as expressed by Eq. 5. By Solving this equation, the parameters can be obtained.

Eq. 5

$$F(\kappa_1, \phi_1, \kappa_2, \phi_2, \omega_2) = \begin{vmatrix} Y_1 & Z_1 \\ Y_2 & Z_2 \end{vmatrix} = Y_1 Z_2 - Y_2 Z_1 = 0 \qquad \text{Eq. 5}$$

Here, between the model coordinate system XYZ and the camera coordinate system xyz, there exist the following expressions of relation for coordinate transformation:

Eq. 6

$$\begin{pmatrix} X_1 \\ Y_1 \\ Z_1 \end{pmatrix} = \begin{pmatrix} \cos\phi_1 & 0 & \sin\phi_1 \\ 0 & 1 & 0 \\ -\sin\phi_1 & 0 & \cos\phi_1 \end{pmatrix} \begin{pmatrix} \cos\kappa_1 & -\sin\kappa_1 & 0 \\ \sin\kappa_1 & \cos\kappa_1 & 0 \\ 0 & 0 & 1 \end{pmatrix} \begin{pmatrix} x_1 \\ y_1 \\ -c \end{pmatrix} \qquad \text{Eq. 6}$$

Eq. 7

$$\begin{pmatrix} X_2 \\ Y_2 \\ Z_2 \end{pmatrix} = \begin{pmatrix} 1 & 0 & 0 \\ 0 & \cos\omega_2 & -\sin\omega_2 \\ 0 & \sin\omega_2 & \cos\omega_2 \end{pmatrix} \begin{pmatrix} \cos\phi_2 & 0 & \sin\phi_2 \\ 0 & 1 & 0 \\ -\sin\phi & 0 & \cos\phi_2 \end{pmatrix} \begin{pmatrix} \cos\kappa_2 & -\sin\kappa_2 & 0 \\ \sin\kappa_2 & \cos\kappa_2 & 0 \\ 0 & 0 & 1 \end{pmatrix} \begin{pmatrix} x_2 \\ y_2 \\ -c \end{pmatrix} + \begin{pmatrix} 1 \\ 0 \\ 0 \end{pmatrix}$$

Eq. 7

With the use of these equations, the unknown parameters are obtained through the following procedure.

1. The initial approximate value is generally set to 0.
2. The values of the differential coefficients obtainable when the coplanar conditional expression 5 is subjected to Taylor's expansion around the approximate value and linearized are obtained from Eqs. 6 and 7 and an observation equation is set up.
3. Through application of the method of least squares, the correction value for correcting the approximate value is obtained.
4. The approximate value is corrected.
5. Using the corrected approximate value, the above operations 2–5 are repeated until convergence is reached.

There can be a case where convergence is not reached when the position of a mark cannot be detected well on account of the shape of the subject or the like. In such case, the operations 1–5 may be performed with such points eliminated one after another and parameters that provided convergence or the best result may be used.

d. FORMATION OF STEREO MODEL

Then, the image is transformed to a stereo model coordinate system making a stereo view obtainable by using the parameters obtained in the orientation process and, thereby, a stereo model is formed.

The transforming equations to the model coordinate are expressed as follows:

Eq. 8

$X_m = t_1(X_1 - X_{01}) + X_{01}$ $X_m, Y_m, Z_m$: Model's Coordinates
$t_1, t_2$: Parameters Eq. 9

$y_m 1/2 \times <t_1(Y_1 - Y_1) + t_2(Y_2 - Y_{02}) + Y_{01} + Y_{02}>$ $X_m, Y_m, Z_m$: Model's Coordinates
$t_1, t_2$: Parameters Eq. 10

$Z_m = t_1(Z_1 - Z_{01}) + Z_{01}$ $X_m, Y_m, Z_m$: Model's Coordinates
$t_1, t_2$: Parameters Thus, it is made ready to carry out the three-dimensional measurement.

e. THREE-DIMENSIONAL MEASUREMENT (1) Point Measurement

By using the characteristic patterns 20 of six points or above as shown in FIG. 6 and subjecting the plurality of marks to the same processes as in the position detection (b), three-dimensional coordinates of them can be obtained automatically and precisely.

(2) Planar Measurement

The initial values for the stereo matching can be provided by the use of the projected characteristic patterns 20 as shown in FIG. 6.

The method to determine the initial values in the case of the planar measurement will be described.

Figure 9:
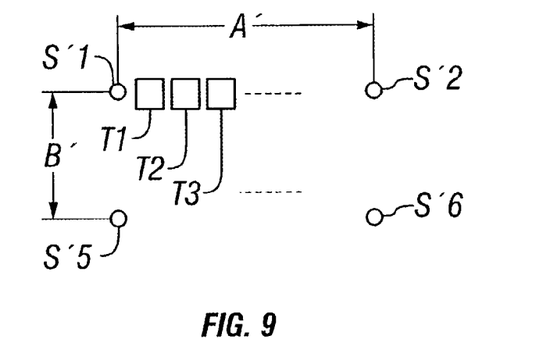
FIG. 9 is an explanatory drawing showing a reference image.
Figure 10:
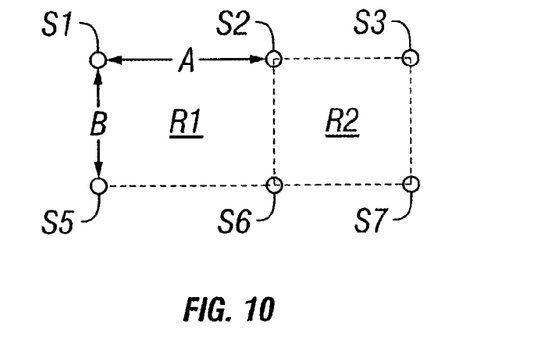
FIG. 10 is an explanatory drawing showing a searched image.

FIG. 9 and FIG. 10 are explanatory drawings which are drawn up by extracting part of the projected characteristic patterns shown in FIG. 6. FIG. 9 shows a reference image serving as a reference and FIG. 10 shows a searched image in which a search is made. Either one of the left and right images may be used as the reference image and the other as the searched image. As an example, here, the left image will be set as the reference image and the right image as the searched image.

With respect to the projected characteristic patterns, S1, S2, S5, and S6 on the searched image correspond to S'1, S'2, S'5, and S'6 on the reference image.

The search for corresponding points is performed by applying stereo matching to a searched area in the searched image with a reference data block in the reference image used as the template image. In the stereo matching, such a process as image correlation is employed.

[Determination of Searched Area]

The method to determine the searched area in accordance with the projected characteristic patterns will be described.

Taking the section (in the horizontal direction) between the projected characteristic patterns S1 and S2 as a width A and the section (in the vertical direction) between S1 and S5 as a width B, the portion enclosed by S1, S2, S5, and S6 is set as a searched area R1. The portion enclosed by S2, S3, S6, and S7 is set as a searched area R2, and, in like manner, successive portions enclosed by their respective projected characteristic patterns are set as searched areas.

Figure 11:
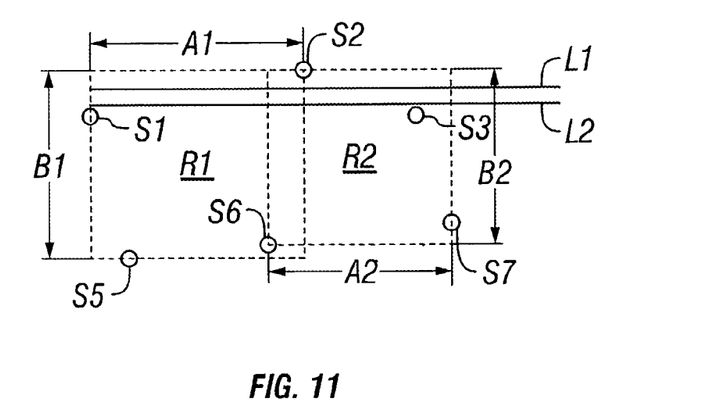
FIG. 11 is an explanatory drawing showing a searched image.

The mark images of actually projected characteristic patterns do not always lie on the same line, as shown in FIG. 11, depending on the shape of the subject or the orientation of the CCD. Hence, such a rectangle is formed from the respective four projected characteristic patterns that has the largest widths A and B and it is set as a searched area. For example, in the case of FIG. 11, the maximum widths obtainable from S1, S2, S5, and S6 is A1 in the horizontal direction and B1 in the vertical direction and the rectangle formed of them is set as the searched area R1, and, likewise, the rectangle formed by the largest widths A2 and B2 obtainable from S2, S3, S6, and S7 is set as the searched area R2. In this way, although a certain overlapping portion is produced, it is ensured that a search can be made also in the boundary portion between the areas R1 and R2.

The method described above is such that determines the range of the searched area in the searched image in accordance with the positions of the mark images in the searched image that are already obtained.

Figure 12:
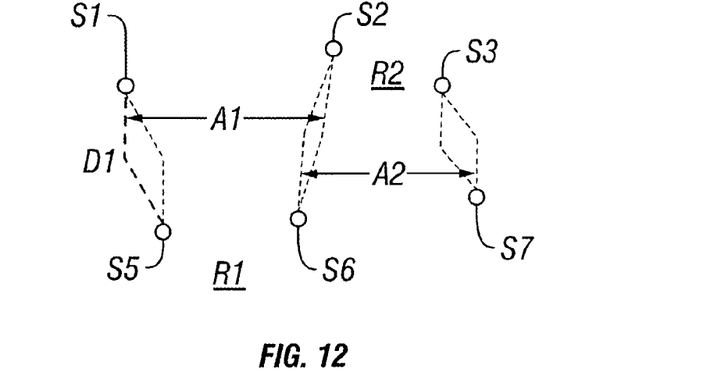
FIG. 12 is an explanatory drawing showing a searched image.

FIG. 12 shows an example of variation of the method to determine the searched area.

Since the respective projected characteristic patterns on the left and right images are already obtained as points corresponding to each other, an effective search can be made if, for example, the searched area is set up such that the search starting point and the search ending point are close to the projected points. Namely, in the example of FIG. 11, if the search along the width A1 is carried out successively shifted in the vertical direction from S1 to S5, there is apparently produced a wasteful searched area (where there is no corresponding point) when the search comes near the line passing the pattern S5.

Hence, down to the position D1 at the halfway point (in the vertical direction) between S1 and S5 of FIG. 12, the points at the same position as the point S1 may be taken as the horizontal search starting points in the searched area and, between D1 and S5, the line connecting D1 to S5 may be taken as the search starting points in the horizontal direction.

By setting up the searched areas through applying the same processing to each of the projected points and performing stereo matching with the searched areas overlapping to a certain extent, somewhat effective searching can be carried out.

Figure 13:
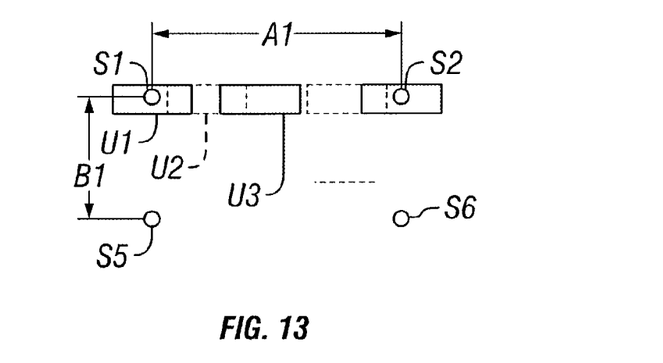
FIG. 13 is an explanatory drawing showing a searched image.
Figure 14:
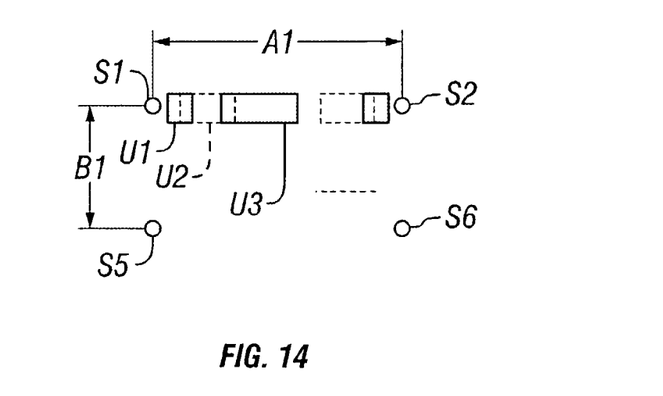
FIG. 14 is an explanatory drawing showing a searched image.

FIG. 13 and FIG. 14 show a case where the search in the searched area is made more effective by setting up searched data blocks in a searched area.

For example, when positions in the searched area corresponding to the reference data blocks T1, T2, T3, . . . in the reference image shown in FIG. 9 are searched for in a section A1 defined by the marks S1 and S2 in the searched image, then, with the searched area divided into some blocks, corresponding searched data blocks U1, U2, U3, . . . are set up as shown in FIG. 13. Then, the search in the searched area can be performed quickly and effectively. At this time, the range of the searched data block can be determined according to the number of the reference data blocks that are set up. When, for example, n reference data blocks are set up in the section A' between the images S'1 and S'2 in the reference image, the range may be set to A1/n, A1/(n−1), or so. In the case divided by (n−1), the search is made with the searched data blocks overlapping each other to a certain degree.

The above described method is such that sets up the range of the searched area in the searched image in accordance with the position of the mark image and the position of the searched area in the searched image that are already obtained. Viewed from another angle, it can also be said that the method is such that sets up the range of the searched area in the searched image in accordance with its relationship with the position of the mark image and the position of the reference data block in the reference image.

A variation example of the method of FIG. 13 is shown in FIG. 14. This method is such that makes the size of the searched data block variable. Namely, the size of the searched data blocks are made smaller in the vicinity of the marks S1 and S2 because it is known for sure that the corresponding point to the reference data block is located near there but, according as the position in question is more distant from there, the size is made larger because the position of the corresponding point becomes vague. Accordingly, the searched data block has its largest size at the position corresponding to the reference data block at the position A'/2.

The sizes of these searched data blocks are determined in accordance with the searched area A1 between S1 and S2.

For example, when the number of the reference data blocks in the section A' is denoted by n, the sizes of the searched data blocks in the section from S1 to S1+A1/2 is set to be $$(1+t \times i/n) \times A1/n,$$

and the sizes of the searched data blocks in the section from S1+A1/2 to S2 is set to be $$(1+t \times (n-i)/n) \times A1/n,$$

where i denotes the positions of the searched data blocks corresponding to their respective reference data blocks, i.e., i=from 1 to n, and t denotes a magnifying factor which is set to a fixed value. For example, when it is desired to make the size of the searched data block at the position S1+A1/2 two times as large as that at the position S1 (U1), t is set to 2.

The sizes of the searched data blocks may also be determined in accordance with the marks S'1 and S'2 and the reference data blocks T1, T2, . . . in the reference image. At this time, A1 above may be replaced with A' and a term with the magnification A1/A' taken into consideration may be multiplied.

By setting up the searched area and the searched data blocks as described above, it becomes possible to carry out the search for the corresponding points effectively, i.e., at high speeds and with increased reliability.

In the above described method, the magnitude of the range of the searched area is set up in the searched image in accordance with its relationship with the positions of the mark image and the position of the searched area in the searched image, or, viewed from another angle, in accordance with its relationship with the position of the mark image and position of the reference data block in the reference image.

[Determination of Reference Data Blocks]

The reference data blocks serving as references are determined in accordance with S'1, S'2, S'5, and S'6 in the reference image or in accordance with S1, S2, S5, and S6 in the searched image. For example, when the distance from S'1 to S'2 is denoted by A' and the distance from S'1 to S'5 by B', then, the reference data block width in the horizontal direction may be set to be A'/n and that in the vertical direction may be set to be B'/m. Otherwise, the sizes may be proportionated to the ratio between the image at the left and that at the right. For example, they may be set to be A'/A *n in the horizontal direction and B'/B *m in the vertical direction.

The number n and m may be given suitable values according to relationship between the size of the subject for measurement and the number of pixels, or they may be set to suitable constants according to the values of A' and B'.

Figure 15:
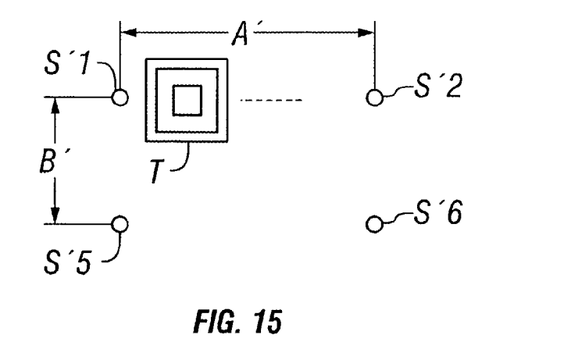
FIG. 15 is an explanatory drawing showing a reference image.

FIG. 15 shows a case where stereo matching the same as above is taken while a reference data block with three sizes, instead of one size, is used and correlation products are calculated. Also, in this case, the three sizes can be determined on the basis of the information of A' and B'.

Figure 16:
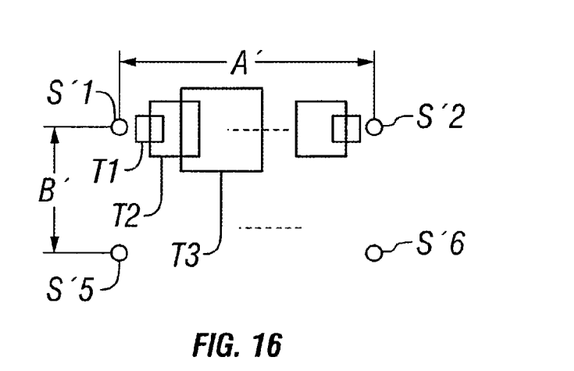
FIG. 16 is an explanatory drawing showing a reference image.

FIG. 16 shows a further variation example of the determination of the reference data blocks in the invention. In the regions close to S'1 and S'2, relatively good correspondence is taken between the reference image and the searched image and hence the reference data blocks can be made smaller. According as the position in question is more distant from there, the corresponding position becomes vague and hence the size of the reference data block is dynamically changed. For example, the reference data block is made larger according as it goes from the position T2 to the position T2 and to the position T3 as shown in FIG. 14. The reference data block is given the largest size when it is at the point A'/2. On the other hand, the size of the reference data block is successively decreased as it goes from A'/2 to S'2.

By taking such means, the reliability of the stereo matching can be increased.

The sizes of the reference data blocks are determined in accordance with the width A' from S'1 to S'2 in the horizontal direction and the width B' from S'1 to S'5 in the vertical direction.

For example, when the numbers of the reference data blocks along the widths A' and B' are denoted by n and m, the reference data block sizes in the section from S'1 to S'1+A'/2 are:

horizontally, $(1+t \times i/n) \times A'/n$;
vertically, $(1+t \times 1/m) \times B'/m$;
the reference data block sizes in the section from S'1+A'/2 to S'2:
horizontally, $(1+t \times (n-i)/n) \times A'/n$;
vertically, $(1+t \times (m-1)/m) \times B'/m$;

where i and 1 denote the respective positions of the reference data blocks, i.e., i=1 to n, and 1=1 to m.

In the above, t denotes a magnifying factor which is set to a desired value. For example, when it is desired to make the size of the reference data block at the position S'1+A'/2 two times as large as that at the position S'1 (T1), t is set to 2.

Thus, the reference data blocks can be made variable.

Further, by making the reference data block with three sizes as shown in FIG. 15 variable as described in the above example and by taking stereo matching with correlation products calculated, searching for corresponding points with still higher reliability can be made.

The sizes of the reference data blocks may similarly be determined in accordance with the marks S1 and S2 in the searched image. Then, A' may be replaced with A1 and B' replaced with B1 and, further, a term with the magnification A'/A1 taken into consideration may be multiplied.

By following the above described procedure, initial values can be automatically obtained.

Now, the procedure for carrying out actual measurement (stereo matching) will be described.

As an example, the case of projected characteristic patterns S1–S8 shown in FIG. 6 will be described with reference to FIGS. 9 and 11.

Since, the orientation processing in the vertical direction is finished and the longitudinal parallax is removed (positioning is completed), it is only required to search along the same line in the reference image and the searched image. The searched data blocks may be set up in each searched area suitably as described above.

1. Searching for corresponding points along the searched width A1 from S1 to S2 of the horizontal line L1 in the searched area R1 of the searched image is performed successively from the reference data blocks T1, T2, T3, . . . in the reference image.

These initial values are previously determined according to some method described above.

When the search along the width A1 of the line L1 in the searched area R1 is finished, 2. then, searching for corresponding points along the searched width A2 from S2 to S3 of the line L1 in the searched area R2 is performed successively from the positions of the reference data blocks set up in the area.

3. Then, searching for corresponding points along the searched width A3 from S3 to S4 of the line L1 in the searched area R3 is performed. For the searched area R3, the searching is successively performed from the template sizes and positions set up in the area.

When the search for corresponding points along the line L1 is finished, then, the searched line is shifted to the next line L2 and searching for corresponding points is performed over again the same as described in the points 1 to 3 above starting with the searched width A1 in the searched area R1.

These searching operations are repeated the number of lines that are necessary.

Through the above described procedure, the initial values, i.e., searched areas, searched data blocks, and reference data blocks, for use in the stereo matching from the positions of the projected characteristic patterns can be automatically determined and automatic measurement becomes possible.

Further, since the reference data blocks in the reference image can be restricted within A' and B' and searched areas in the searched image are also restricted, much faster processing than in ordinary stereo matching can be achieved. Namely, stereo matching is ordinarily performed along one horizontal line in each searched position (refer to FIG. 6, line), the processing time can be reduced to a fraction of the ordinarily required time according to the number of the projected points.

Further, since the mutually corresponding areas in the reference and searched images can be obtained in previously restricted states, mismatching can be greatly reduced. That is, the reliability of the stereo matching can be greatly improved.

In addition, since the reference data blocks, the searched areas, and the searched data blocks can be suitably determined according to positional information of the projected points, the reliability of the stereo matching can further be improved.

Further, since the reference data blocks and the searched data blocks can be dynamically varied according to the searched positions, the reliability can furthermore be improved.

Further, since the above described stereo matching can be made on the images having no projected characteristic patterns, erroneous detection on account of the characteristic patterns does not occur. Further, since the image having no characteristic patterns has the value as data of an image database, the original image can be stored at the same time as it is measured.

Further, according to the above described embodiment, since an image with characteristic patterns projected thereon and an image with them not projected thereon are used, the need for the work to glue a mark onto the subject can be eliminated and hence it becomes possible to make measurement on a subject, onto which a mark cannot be glued.

Thus, by the capability of forming an image having only characteristic pattern information by obtaining the difference between an image with characteristic patterns and an image without them, the processes of detection of characteristic pattern positions—orientation—stereo model formation—three-dimensional measurement can be performed without requiring manual work but automatically and precisely. Namely, the need for manual work for orientation and three-dimensional measurement which has been troublesome and requiring skill can be eliminated and all the processes can be automatically performed with increased reliability.

Furthermore, since it is not necessary to firmly secure the camera to the pan tilt head but highly precise three-dimensional measurement can be achieved only by roughly setting up two cameras in the field and taking images, such an excellent effect is obtained that measurement can be performed simply and not depending on the conditions in the field and of the subject.

Besides, by increasing the number of points of the characteristic patterns, it becomes possible to use the same as the initial values for stereo matching, i.e., to set up the searched widths and template images to achieve automatic stereo matching. Therefore, such an excellent effect is obtained that the surface shape of the subject can be automatically measured while the time required for the stereo matching is greatly reduced and the reliability of it is much improved.

Now, the outline of the image measuring apparatus according to the invention will be described with reference to FIG. 17.

The image measuring apparatus 30 comprises an approximate position measuring portion 31, a data setting portion 32, and a correspondence determining portion 33.

The approximate position measuring portion 31 is adapted to use a characteristic pattern image of which positional information is previously known and, from a pair of images of a subject for measurement from different angles, to obtain approximately the positional information of the subject for measurement in each image.

The data setting portion 32 is adapted to set one of the pair of images as a reference image and the other as a searched image and, on the basis of the positional information obtained in the approximate position measuring portion 31, to set up reference data blocks in the reference image and set up searched areas in the searched image.

The correspondence determining portion 33 is adapted to obtain correspondence between a searched data block set up in the searched area and the reference data block.

By using the image measuring apparatus 30, it becomes possible to achieve automation of three-dimensional measurement described in detail and improve accuracy in the measurement.

Figure 17:
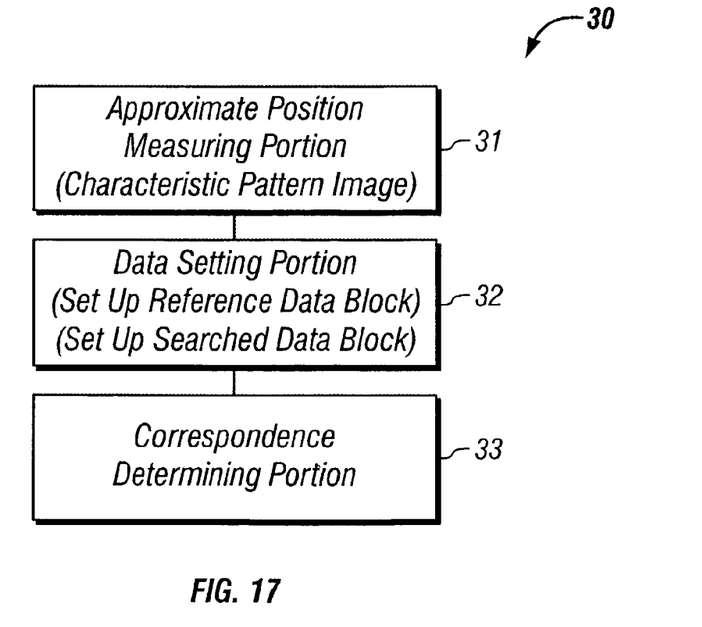
FIG. 17 is a block diagram showing an outline of an image measuring apparatus according to the invention.

The described image measuring apparatus of FIG. 17 is such that is applicable to the shape measuring apparatus described with reference to FIGS. 1–16.

According to the shape measuring apparatus of the invention, a pair of first images of a subject for measurement with characteristic patterns serving as references provided thereon in different directions and a pair of second images of the subject for measurement with no characteristic patterns serving as references provided thereon in the same directions as with the first images are used and, in accordance with the first and second images, the measuring processes from the orientation work to the three-dimensional measurement can be performed not requiring manual work but automatically, effectively, and precisely.

Further, according to the image forming apparatus for shape measurement of the invention, it is possible to form a pair of first images of a subject for measurement with characteristic patterns serving as references provided thereon in different directions and a pair of second images of the subject for measurement with no characteristic patterns serving as references provided thereon in the same directions as with the first images.

According to the apparatus of the invention, in obtaining, from a pair of images of a subject for measurement in different directions, approximate positional information of the subject for measurement in each image, setting one of the pair of images as a reference image and the other image as a searched image, and, on the basis of the positional information obtained in the approximate position measuring portion, setting up reference data blocks in the reference image, setting up searched areas in the searched image, and setting up, searched data blocks in the searched area, and obtaining correspondence between the searched data block set up in the searched area and the reference data block, the apparatus is adapted to perform at least either setting up of reference data blocks in the reference image or setting up of the searched areas in the searched image and setting up of the searched data blocks therein on the basis of the approximate positional information, and, therefore, the correspondence can be accurately obtained.

What is claimed is:

1. An image measuring apparatus comprising:
   an approximate position measuring portion for approximately obtaining from a pair of images of a subject for measurement in different directions, positional information of the subject for measurement in each of the images;
   a data setting portion, having one image of the pair of images set as a reference image and the other image as a searched image, for setting up, in accordance with the positional information obtained in said approximate position measuring portion, reference data blocks in the reference image and setting up searched areas in the searched image and searched data blocks in the searched area; and
   a correspondence determining portion for obtaining correspondence between the searched data block set up in the searched area and the reference data block, wherein
   said data setting portion is adapted, in accordance with the positional information obtained in said approximate position measuring portion, to perform at least either setting up of the reference data blocks in the reference image or setting up of the searched areas and setting up of the searched data blocks in the searched image.

2. An image measuring apparatus according to claim 1, wherein
   said pair of images include a characteristic pattern image of which positional information is previously known, and
   said approximate position measuring portion is adapted, in accordance with the position of the characteristic pattern image in the reference image and the positional information of the characteristic pattern image in the searched image, to approximately obtain the positional information of the subject for measurement in each of the pair of images.

3. An image measuring apparatus according to claim 2, wherein said data setting portion is adapted to set up the range of the searched area in the searched image in accordance with the position of the characteristic pattern image in the searched image.

4. An image measuring apparatus according to claim 2, wherein said data setting portion is adapted to set up the range of the searched area in the searched image in accordance with its relationship with the position of the characteristic pattern image and the position of the searched area in the searched image or with the position of the characteristic pattern image and the position of the reference data block in the reference image.

5. An image measuring apparatus according to claim 2, wherein said data setting portion is adapted to set up the magnitude of the range of the searched area in the searched image in accordance with its relationship with the position of the characteristic pattern image and the position of the searched area in the searched image or with the position of the characteristic pattern image and the position of the reference data block in the reference image.

6. An image measuring apparatus according to claim 5, wherein said data setting portion is adapted to set up in the searched image the range of the searched area having a larger width or area according as the characteristic pattern image and the searched area in the searched image, or the characteristic pattern image and the reference data block in the reference image are more distant from each other.

7. An image measuring apparatus according to claim 3, wherein said data setting portion is adapted to set up a plurality of searched areas differing in size.

8. An image measuring apparatus according to claim 2, wherein said data setting portion is adapted to set up the reference data block in the reference image in accordance with the position of the characteristic pattern image in the reference image.

9. An image measuring apparatus according to claim 2, wherein said data setting portion is adapted to set up the magnitude of the reference data block in the reference image in accordance with the position of the characteristic pattern image and the position of the reference data block in the reference image.

10. An image measuring apparatus according to claim 2, wherein said data setting portion is adapted to set up in the reference image the reference data block larger in height or width according as the position of the characteristic pattern image and the position of the reference data block in the reference image are more distant from each other.

11. An image measuring apparatus according to claim 8, wherein said data setting portion is adapted to set up a plurality of reference data blocks differing in size in accordance with the characteristic pattern image in the reference image.

12. An image measuring apparatus according to claim 4, wherein said data setting portion is adapted to set up a plurality of searched areas differing in size.

13. An image measuring apparatus according to claim 5, wherein said data setting portion is adapted to set up a plurality of searched areas differing in size.

14. An image measuring apparatus according to claim 6, wherein said data setting portion is adapted to set up a plurality of searched areas differing in size.

15. An image measuring apparatus according to claim 9, wherein said data setting portion is adapted to set up a plurality of reference data blocks differing in size in accordance with the characteristic pattern image in the reference image.

16. An image measuring apparatus according to claim 10, wherein said data setting portion is adapted to set up a plurality of reference data blocks differing in size in accordance with the characteristic pattern image in the reference image.

* * * * *